Figure 1:
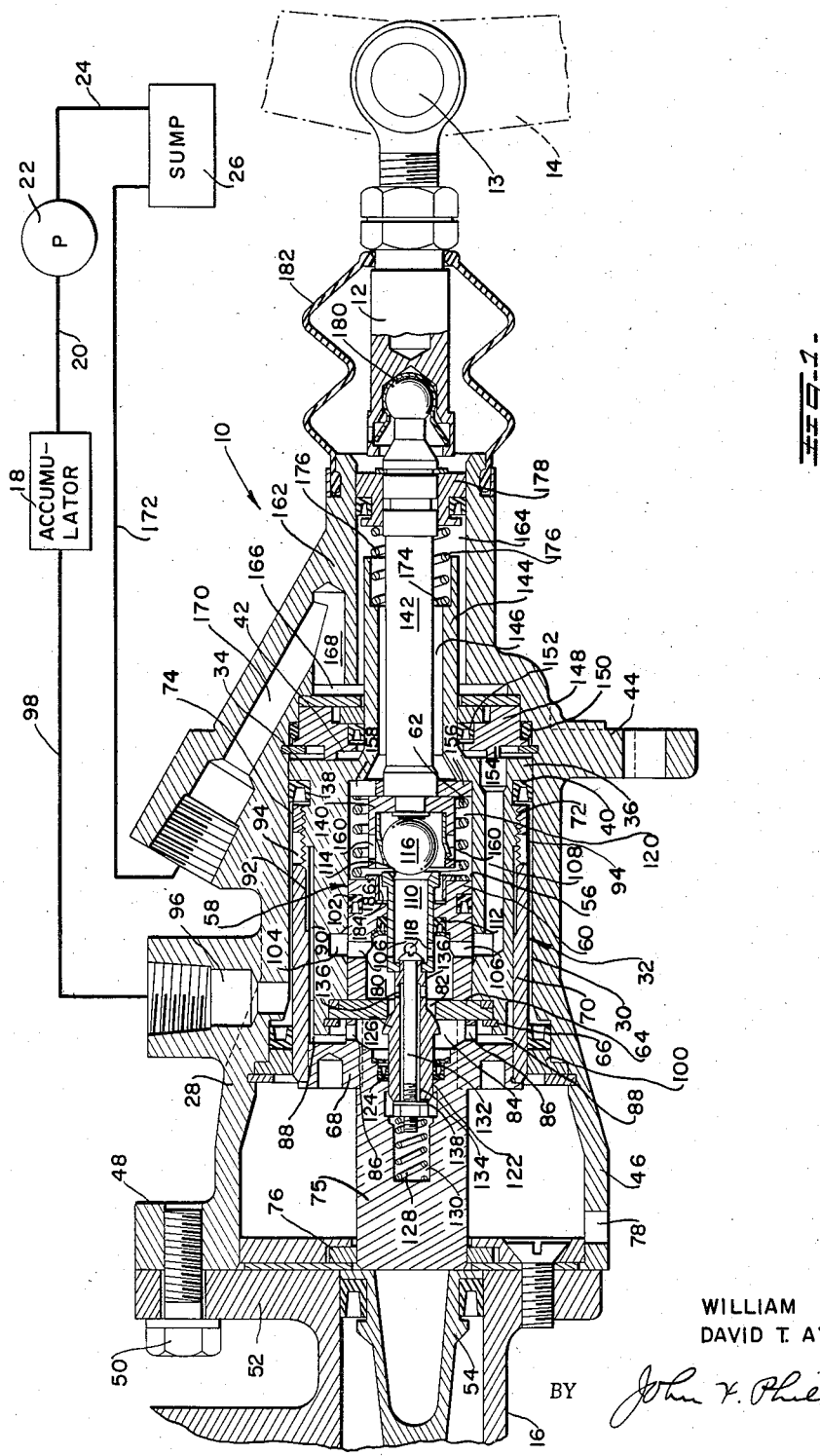

United States Patent Office 2,879,747
Patented Mar. 31, 1959

2,879,747

FLUID-PRESSURE-OPERATED BOOSTER
BRAKE MECHANISM

William Stelzer, Bloomfield Hills, and David T. Ayers, Jr., Birmingham, Mich., assignors to Kelsey-Hayes Company, Detroit, Mich., a corporation of Delaware Application June 6, 1957, Serial No. 664,037

13 Claims. (Cl. 121—41)

This invention relates generally to an improved fluid-pressure-operated booster motor mechanism adapted to operate a manually operable master cylinder of a booster brake system or the like, wherein said booster motor is supplied with a source of pressure fluid from an accumulator or the like of a closed fluid pressure system.

This invention constitutes an improvement over the co-pending application for patent of William Stelzer, entitled Hydraulic Operated Booster Brake Mechanism, Serial No. 652,433, filed April 12, 1957. The booster brake mechanism of the copending application, although having desirable performance characteristics, includes a force transmitting piston operatively connected to a flexible line movable therewith during actuation, and incorporates a return spring operatively connected to an operator-operated control unit biasing the same toward an off condition and imposing a load thereon during power actuation and manual actuation of the motor, thus providing a "built-in" false reaction characteristic felt by the operator of the system.

An important object of the present invention is to provide a booster motor including a force transmitting unit pressure-biased toward an off position during "power on" conditions of the system, and assuring that a minimum load will be imposed against actuation of the motor during both power and manual actuation of the motor, thus giving rise to more positive and accurate transmittal of pedal reaction characteristics to an operator of the system.

A further object of the invention is to provide an improved fluid pressure operated booster motor to be utilized in a closed fluid pressure system including means whereby the fluid pressure utilized for operating the booster motor provides a constant biasing pressure for urging the force transmitting unit of the motor toward an off position and permits a minimum load to be imposed against manual actuation of the master cylinder or the like during a power failure.

A further object is to provide in a booster motor of the character set forth means whereby the operating fluid pressure for the motor is utilized as a constant biasing force against a force transmitting unit of the motor during "power on" conditions of a closed fluid pressure system in which the motor is utilized, and offers no resistance to manual actuation of the unit during "power off" conditions.

A further object is to provide in a booster motor of the character involved a fluid pressure biased force transmitting unit supporting an operator-operated control unit including means for transmitting two-stage fluid pressure pedal reaction characteristics to an operator of the system during actuation of the motor, and means deadening transition noises between first and second stages of transmittal of pedal reaction characteristics.

A further object is to provide a booster motor of the character mentioned in which the force transmitting unit and control unit of the motor are in co-axial relationship in a body member forming operatively connected co-axial motor, biasing-pressure supply and reaction chambers and in which manually movable parts of the control unit are substantially pressure-balanced during both off and activated conditions of the motor in the absence of a residual spring-biasing pressure imposed on the control unit, and which permits the axial application of actuation force and transmittal of pedal reaction characteristics with a minimum resistance imposed against actuation of the motor, and further provides a constant pressure-biasing force in the pressure-biasing chamber operative to urge the force transmitting unit toward an off position during "power on" conditions of the system in which the motor is utilized.

Other objects and advantages of the invention will become apparent from a consideration of the following description, taken in connection with the accompanying drawings, wherein an exemplary embodiment of the invention is disclosed.

Figure 2:
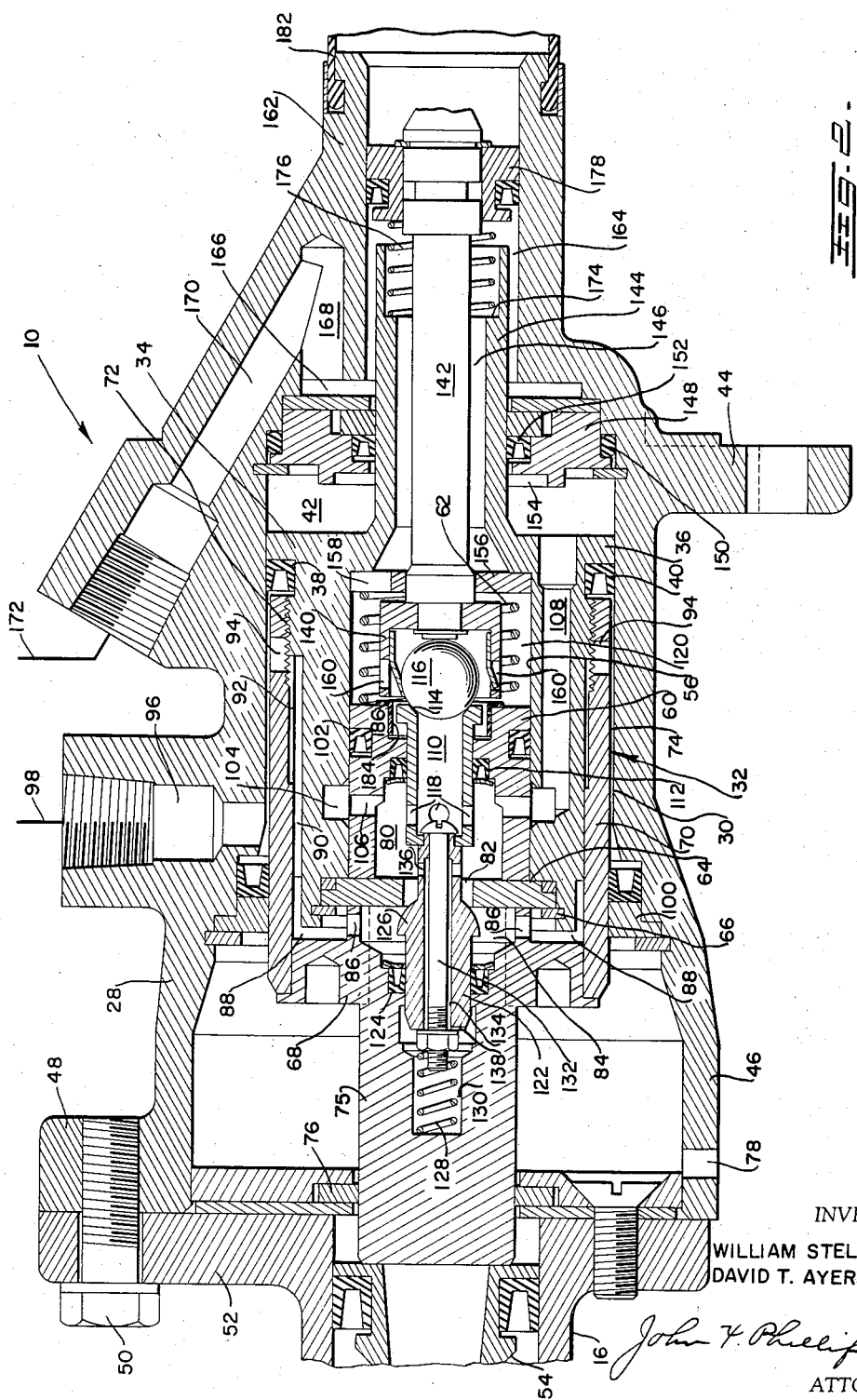

In the drawings:

Figure 1 is an axial section through the booster motor of the invention in relation to a fragmentary portion of a manually operated master cylinder also shown in section, parts of a closed fluid pressure system being represented diagrammatically, and a fragmentary portion of an actuating pedal being shown by means of phantom lines; and Figure 2 is an axial section similar to a portion of Figure 1, on a slightly enlarged scale, showing the parts of the booster motor in operative positions.

Referring to Figure 1, there is shown diagrammatically a closed fluid pressure system for operating a booster motor indicated generally at 10, the motor being actuated by an axial rod 12 connected as at 13 to an actuating lever shown fragmentarily at 14. Extending forwardly in axial relationship to the booster motor is a conventional master cylinder shown fragmentarily at 16 which will be operatively connected through fluid lines with conventional wheel cylinders (not shown).

The booster motor is adapted to be operated from a source of static or constant pressure, for example, from an accumulator 18 supplied with hydraulic fluid under pressure through a line 20 from a pump 22. Fluid is supplied to the pump through a line 24 leading from a sump 26.

Referring to Figures 1 and 2, the booster motor 10 comprises a housing or body member 28 having a bore 30 in one end, in which is reciprocably received a piston or force transmitting unit indicated generally at 32. The force transmitting unit comprises a body 34 including an annular flange 36 adjacent an annular groove 38 receiving therein a suitable lipped seal 40 sealing the body 34 in the bore or cylinder 30, and forming with the adjacent end of the body member or housing 28 a pressure or motor chamber 42, in which fluid pressure is established in a manner to be described, to effect movement of the piston or force transmitting unit 32 toward the left as viewed in the drawings. The body member 28 is flanged as indicated at 44 to be bolted on a vehicle fire wall or the like (not shown).

The forward end of the body member 28 is enlarged as at 46, the enlargement being flanged as at 48 to be secured as at 50 to a cooperating flanged portion 52 on the master cylinder. The master cylinder is provided with an axially displaceable conventional fluid displacing plunger 54 for conventionally displacing hydraulic fluid to the wheel cylinders of a vehicle.

The body 34 of the force transmitting unit is provided with a longitudinal bore 56 reciprocably receiving therein a reaction or control unit indicated generally at 58. The reaction unit includes a reaction plunger 60 biased forwardly by a compression spring 62, the forward movement of the plunger being limited by a transverse valve seat disc 64 held in position by a snap ring 66.

The force transmitting unit 32 includes an axially extending force transmitting body 68 fitting within a sleeve 70 surrounding and having a threaded connection with the body 34 as indicated at 72. The sleeve 70 is of a lesser diameter than the bore 30 of the body member 28 and forms therewith an annular biasing-pressure chamber indicated at 74 which will be subject to the static or accumlator pressure as will be described. It will be noted that the annular biasing-pressure chamber 74 has one end defined by the lipped seal 40 subjecting the same to pressures existing in the pressure-biasing chamber wherein the pressures act against the seal to urge it into sealing relationship with the bore 30. In the absence of other structure, it will be noted, that pressures existing in the biasing-pressure chamber constantly urge the force transmitting unit 32 toward the right or toward the off position of the booster motor shown in Figure 1. Additionally, the biasing-pressure exerted on the force transmitting unit performs the function of the return spring disclosed in the co-pending application Serial No. 652,433, the force of this spring being present during both "power on" and "power off" conditions of the system. In the present invention, the biasing-pressure does not impose a load to be felt by the operator of the booster motor when manually actuating the vehicle brakes during said "power off" conditions.

The body 68 includes a reduced forwardly extending axial projection 75 abuttingly engaging the master cylinder plunger 54 and slidable through a seal indicated at 76. It will be apparent that upon movement of the force transmitting unit 32 to the left, force will be transmitted to the master cylinder plunger 54 to displace fluid from the master cylinder. The enlargement 46 has extending transversely therethrough a port 78 venting the interior of said enlargement forwardly of the force tansmitting unit to prevent the accumulation of a back pressure on said unit.

The forward end of the plunger body 60 includes a reaction chamber 80 communicating through an axial opening 82 in the valve seat disc 64 with a fluid pressure supply chamber 84. The chamber 84 communicates through ports 86, an annular passage 88 forwardly of the body 34, a longitudinal groove 90 formed in the outer periphery of the body 34, an annular passage 92 formed on the inner periphery of the sleeve 70 and lateral ports 94 in the sleeve 70 with the annular biasing-pressure chamber 74. The body member 28 includes a laterally extending fluid pressure inlet port 96 in communication with the accumulator 18 by means of a line 98. Thus the fluid pressure from the accumulator 18, during a "power on" condition of the system, is directed to both the biasing-pressure chamber 74 and the supply chamber 84. It will be noted that the motor chamber 42 is disposed in spaced relation from the biasing-pressure chamber 74, and the exposed or effective area of the flange 36 in the motor chamber 42 is greater than the effective area exposed to the biasing-pressure fluid in the chamber 74. The sleeve 70 is sealed with respect to the body member 28 as indicated at 100.

The reaction plunger 60 is sealed relative to the bore 56 as indicated at 102, and formed in said bore forwardly of the seal 102 is an annular passage 104 of sufficient width to be in constant communication with radial ports 106 extending through the reaction plunger 60 and communicating with the reaction chamber 80. The annular passage 104 communicates with a longitudinally extending passage 108 formed in the body 34 and communicating with the motor chamber 42. Thus the reaction chamber 80 is in constant communication with the motor chamber 42 through the ports 106, passage 104 and passage 108.

A tubular valve seat member 110 is axially reciprocable through the reaction plunger 60 in sealed relationship thereto as indicated at 112 and is provided at its rearward end with a valve seat 114 engageable with a ball valve 116. The interior of the valve seat member 110 is in constant communication with the reaction chamber 80 through radial ports 118 formed in the valve seat member 110 forwardly of the seal 112. The parts are in normal position as shown in Figure 1 when pressure fluid is available in the system and the brakes are not applied. In Figure 2, the parts are shown in partially brake applied condition with the valve 72 closed. The valve is normally open and, accordingly, the opening through the valve seat member normally communicates with a chamber 120 formed in the body 34 rearwardly of the reaction plunger 60, as clearly seen in Figure 1.

A valve body 122 is mounted for axial reciprocable movement in the force transmitting body 68, being sealed relative thereto as indicated at 124, the valve body including in the supply chamber 84 a valve portion 126 engageable with the forward end of the axial opening 82. The valve portion 126 is normally closed and is biased to the closed position shown in Figure 1 by an axial compression spring 128 arranged in a chamber 130 formed in the projection 75. The valve body 122 is fixed to the valve seat member 110 by an elongated bolt 132, and the opening in the valve body through which the bolt extends is of an enlarged diameter to form a passage 134 affording communication between the chambers 80 and 130 by means of lateral ports 136 and a radial groove 138 communicating with said passage 134 to balance pressures existing in the chambers 80 and 130 which will affect the valve body 122. The diameter of the valve body 122 is preferably equal to the diameter of the opening 82 to insure the balance of pressures affecting the valve body.

The ball valve 116 is mounted in a cup 140 carried by the forward end of an axially disposed push rod 142, and the push rod is axially slidable through a rearwardly extending tubular member 144 formed integrally with the force transmitting unit body 34, said tubular member forming an annular passage 146 about the push rod. The body member 28 of the booster motor includes an annular ring member 148 sealed as indicated at 150 and 152 with respect to the body member and the tubular sleeve 144. The ring member 148 incorporates a forwardly extending annular spacing rib 154 abuting the rear end of the body 34 of the reaction unit and defining the minimum size of the motor chamber 42. The spacing rib 154 insures communication between the chambers 80 and 42. The bore 56 has disposed in the rear end thereof an annular seat member 156 through which the push rod extends, said seat member incorporating a radial notch 158 communicating with the annular passage 146, which is flared at its forward end, and with the chamber 120. The cup 140 incorporates lateral ports 160 communicating the interior of said cup with the chamber 120.

The body member 28 includes a rearwardly extending tubular extension 162 surrounding the sleeve 144 and extending rearwardly therebeyond, forming about said sleeve an annular passage 164 which communicates past the terminal end of the sleeve 144 with the annular passage 146. The passage 164 terminates forwardly in an enlarged annular groove 166 communicating with a longitudinal passage 168 in the body member. Communicating with the passage 168 is a lateral port 170 connected to a line 172 which communicates with the sump 26.

The rear end of the tubular extension 144 carries a spring seat 174, and a return spring 176 is arranged between this seat and a suitable seal surrounding and movable with the push rod 142 as indicated at 178. The spring 176 biases the push rod 142 relative to the body 34 of the reaction unit causing the cup 140 to seat against element 156 as seen at Figure 1. The rear end of the push rod 142 is mounted in a socket 180 carried by the pedal operable rod 12. A protective collapsible boot 182 is connected between the pedal operable rod 12 and the extension 162 of the body member of the booster motor. The interior of the boot may be vented to the atmosphere in any suitable manner.

Secured on the rear end of the reaction plunger 60 is a "hat" shaped sound deadening element of nylon or any other suitable material indicated at 184, and including an annular flange 186 engageable with the forward edge of the cap 140 for obviating transition noises during the transmittal of first and second stages of pedal reaction during operation of the booster motor.

Operation

As seen in Figure 1, the parts normally occupy a position with the reaction unit body 34 at its right-hand limit of movement against the annular rib 154 of the ring member 148 defining the minimum limit of the motor chamber 42. The cup 140 will be in engagement with the element 156 at the right-hand end of the chamber 120, and the valve 116 will be open. The valve portion 126 will be seated and accordingly static or accumulator pressure will exist in the line 98 and thus in the supply chamber 84. The supply chamber will be cut off from the reaction chamber 80 by the closing of the valve portion 126. The ball valve 116 being in spaced relation from its cooperating seat 114 and open during a "pressure on" condition of the system and the off position of the parts, will permit the motor chamber 42 to communicate through passage 108, passage 104, ports 106, chamber 80, the interior of the valve seat member 110, chamber 120, ports 160, notch 158, and thence with the annular passages 146 and 164 to passages 166 and 168 and port 170 with the sump 26 through line 172. Accordingly atmospheric pressure will exist in the motor chamber 42.

When the brakes are to be operated, the pedal 14 will be depressed, thus moving the push rod 142 toward the left in Figure 1 to seat the valve 116 against the valve seat 114. This action disconnects the chamber 120 from the reaction chamber 80, and the valve 116 and valve portion 126 will be in lap position. Slight further movement of the push rod 142 will impart movement through the valve 116 to the valve seat 114, and such movement will be directly transmitted to the valve body 122 to open the valve portion 126. The parts will now be in the position shown in Figure 2 and brake operation will take place.

The valve portion 126 now being open, fluid pressure will be supplied through the opening 82 into the motor chamber 42, and the entire force transmitting unit 32 will move to the left, for example, to the position shown in Figure 2. Movement of the force transmitting unit will be transmitted to the master cylinder plunger 54 to displace fluid into the brake lines.

It will be noted that the biasing-pressure chamber 74 will be in constant communication with the fluid pressure from the accumulator 18, and will be in opposition to pressures existing in the motor chamber when the motor chamber 42 communicates with the supply chamber 84, the effective area of the flange 36 exposed to the motor chamber 42 being greater than the opposite side of said flange exposed to the pressure existing in chamber 74. Thus the effective force on the right-hand side of flange 36 will cause the force transmitting unit 32 to move toward the left as shown in Figure 2, and the effective area will comprise the difference between the opposed areas of the flange 36 exposed to the motor chamber and the biasing-pressure chamber.

At this point, it will be noted that pressure in the chamber 80, will be cut off from the chamber 120, and will act against the ball 116 to transmit a relatively low pedal reaction to the brake pedal. The line of engagement of the ball 116 with its seat 114 is equal to the external diameter of the valve seat member 110, hence pressures in the chamber 120, acting on the valve seat member 110, will be balanced. As previously stated, the line of engagement of the valve portion 126 with its cooperating seat is equal to the diameter of the valve body 122. Accordingly, when the valve portion 126 was closed, pressures in the chamber 84 affecting the valve portion 126 were balanced. The external diameter of the valve seat member 110 being substantially equal to the diameter of the opening 82, oppositely acting pressures in the chamber 80 affecting the valve portion 126 when it was closed also will be substantially equalized. When the valve 126 is open, pressure is equalized in the chambers 80 and 84, and such pressure is communicated through the passage 134, and it will be apparent that the structure including the members 110 and 122 will be subject to balanced pressures.

As previously stated, pedal reaction is transmitted to the brake pedal under the conditions illustrated in Figure 2 by pressure acting against the ball 116. Sufficient pedal pressure is necessary to overcome this reaction, as will be obvious. Such pressure will be maintained and increased to continue the operation of the force transmitting unit 32 to the left. Accordingly, the relatively low reaction forces during initial brake operation will progressively increase as pressures are built up in the reaction chamber 80 and in the motor chamber 42. Any relieving of the pressure against the brake pedal will release pressure from the interior of the seat member 110 into the chamber 120 to arrest further movement of the force transmitting unit 32. The mechanism described therefor serves to provide a perfect follow-up action of the force transmitting or piston unit 32 relative to the brake pedal.

It is highly desirable in a booster motor to provide a relatively low pedal reaction ratio during initial stages of brake operation and relatively high pedal reaction ratios at later stages of brake operation. Up to the point of operation in the apparatus as shown in Figure 2, the left-hand end of the reaction plunger 60 will be retained in engagement with the valve seat disc 64, being held in such position by the spring 62. Accordingly, the reaction plunger 60 up to this point will have moved as a unit with the force transmitting unit body 34. As the pressure increases in the master cylinder, increased motor operating pressures are required as will be apparent, and accordingly pressures in the reaction chamber 80 will reflect and be proportionate to the pressures in the master cylinder. When the latter pressure reaches a predetermined point, the pressure in the reaction chamber 60 will increase to the point necessary to overcome the loading of the spring 62.

Up to the point illustrated in Figure 2, it will be noted that the left-hand end of the cup 140 will be slightly spaced from the adjacent end of the reaction plunger 60. Additionally, it will be noted that the flange 186 of the sound deadening element 184 is interposed between the plunger 60 and the adjacent end of the cap 140. As soon as the pressure in the chamber 80 increases to the predetermined point referred to, the play between the cup 140 and reaction plunger 60 will be taken up, the plunger moving to the right of the position shown in Figure 2 away from the valve seat disc 64. Transition noises during the engagement between the reaction plunger 60 and cup 140 will be deadened by element 184. Whereas the previous reaction was limited to the area of the line of contact of the ball 116 with its cooperating seat 114, the reaction area now becomes the diameter of the reaction plunger 60. Therefore, reaction pressures will be substantially increased in the later stages of brake operation, as is highly desirable to afford an operator of the system positive feel characteristics and a feeling of control of the system.

The maximum brake application is determined by the operator's ability to exert force against the brake pedal 14. Beyond the point of operation of the mechanism just described, a point of power run-out of the booster motor will occur, that is, the point at which the maximum pressures in the motor chamber 42 can no longer increase pressures in the master cylinder. Therefore, the application of increased forces against the brake pedal will cause the reaction plunger 60 to be moved by the cup 140 back into engagement with the valve seat disc 64, and after this point is reached, direct pedal pressures will be transmitted through the extension 75 to the master cylinder plunger 54.

The brakes are released by releasing the brake pedal 14 as will be apparent. As soon as this action takes place, the pressure in the chamber 80 will unseat the ball 116, thus relieving pressures from the motor chamber 42 through the passage 108 and chamber 80 into the chamber 120. The valve portion 126 will be closed by the spring 128 and the fluid in the chamber 42 will be returned to the sump around the ball 116 and through the chamber 120 and port 170. The spring 62 obviously will return the reaction plunger 60 to its normal position in engagement with the valve seat disc 64, and the pressure in the biasing-pressure chamber 74 will return the force transmitting unit 32 to its normal position referred to.

It will be noted that the force transmitting unit contains all the motor control valving as well as devices for providing the two-stages of pedal reaction described above. All of the parts are disposed in co-axial relationship, whereby direct forces are applied on the cooperating parts for actuating the booster motor and for transmitting pedal reaction characteristics to an operator of the system, with an accompanying minimum amount of strain on the cooperating parts.

Assuming that there is a failure of power in the system, i.e., fluid pressure will not be available in the accumulator 18, the brakes may be operated directly by pedal pressure. Under such conditions, the operation of the push rod 142 to open the valve portion 126 will not result in motor operation, and the left-hand edge of the cup 140 in Figure 1 will quickly move into engagement with the reaction plunger 60. During this time, there will be no pressure in the biasing-pressure chamber 74. Direct pedal pressures then will be applied through the plunger 60 to the relatively fixed elements in the force transmitting unit and thus to the master cylinder plunger 54 to operate the brakes directly by pedal pressure.

It will be noted that in addition to all of the elements of the apparatus which affect its operation being operated through the transmittal of co-axial forces, the parts are maintained in a pressure balanced condition. Thus in addition to relieving strain on the parts, the structure imposes minimum loads against either manual or power actuation of the booster motor. Additionally, the necessity for built in "false" pedal reaction is eliminated through the utilization of the biasing-pressure chamber, the only spring pressure or residual load which must be overcome being that of the spring 128 in chamber 130 and minor friction losses.

It is to be understood that the form of the invention shown and described is to be taken as a preferred example of the same and that various changes in the shape, size, and arrangement of the parts may be made as do not depart from the spirit of the invention or the scope of the appended claims.

We claim:

1. A booster motor for use in a closed fluid pressure system comprising a body member, a piston unit reciprocable in the body member and forming at one end thereof a motor chamber, means on said piston unit cooperating with the body member to form a biasing-pressure chamber in opposed relation to said motor chamber, fluid relief outlet means in the body member normally communicating with the motor chamber, high pressure fluid inlet means normally communicating with the biasing-pressure chamber, and an operator-operated control unit including valve means and reaction means reciprocable in the piston unit and forming with the piston unit communicable supply and reaction chambers, said piston unit including conduit means communicating said reaction chamber with the motor chamber, said valve means permitting communication between the motor chamber and said fluid outlet means or said high pressure fluid inlet means through said reaction chamber with a constant biasing-pressure being present in the biasing-pressure chamber for reacting on the first mentioned means to bias the piston unit toward its normal position.

2. A booster motor as set forth in claim 1 in which said first mentioned means on said piston unit includes opposed effective areas exposed in the motor and biasing-pressure chambers, said effective area in said motor chamber being greater than that in said biasing-pressure chamber.

3. A booster motor as set forth in claim 1 in which said control unit includes pressure-responsive displaceable means exposed to pressure in said reaction chamber for transmitting reaction characteristics to an operator of the system.

4. A booster motor as set forth in claim 3 in which said first mentioned means on said piston unit includes opposed effective areas exposed in said motor and biasing-pressure chambers, the effective area in said motor chamber being greater than that in said biasing-pressure chamber.

5. A booster motor as set forth in claim 3 in which said pressure-responsive displaceable means includes sound deadening means for diminishing transition noises during the transmittal of said reaction characteristics.

6. In a fluid-pressure-operated motor mechanism for assisting a manually operable master cylinder of a power booster brake system, a body member including a high pressure fluid inlet and fluid outlet for communication in a closed fluid pressure system, a force transmitting unit reciprocable in the body member and including means forming with said body member opposed variable volume motor and biasing-pressure chambers, means communicating the fluid outlet and high pressure fluid inlet with the respective motor and biasing-pressure chambers, and an operator-operated control unit reciprocable in said force transmitting unit forming communicable supply and reaction chambers respectively communicating with said biasing-pressure and motor chambers, said control unit including valve means operable for communicating the supply and reaction chambers with the motor chamber and for closing off communication of the motor chamber with the fluid outlet, with a constant biasing-pressure being maintained in the biasing-pressure chamber for urging the force transmitting unit toward a normal position.

7. A fluid-pressure-operated motor mechanism as set forth in claim 6 in which the means forming said opposed motor and biasing-pressure chambers includes a peripheral flange at one end of the force transmitting unit incorporating opposed effective areas exposed to pressures in the respective chambers, the exposed area in the biasing-pressure chamber being less than that in the motor chamber.

8. A fluid-pressure-operated motor mechanism as set forth in claim 7 in which the valve means is axially displaceable in the control unit and includes means affording axial communication between the supply and reaction chambers.

9. A fluid-pressure-operated motor mechanism as set forth in claim 8 in which the valve mechanism comprises a co-axial reaction unit exposed to pressure in said reaction chamber and a biasing spring yieldable for transmitting reaction characteristics through the control unit to an operator of the booster system.

10. A fluid-pressure-operated motor mechanism as set forth in claim 9 in which the reaction unit includes sound deadening means for reducing transition noises during reaction transmittal.

11. A high pressure fluid operated booster motor for actuating a manually operable master cylinder or the like comprising a longitudinally bored body member, a force transmitting piston unit reciprocably supported in the body member and including means forming with the body member co-axial motor and biasing-pressure chambers, and an operator-operated control unit co-axially and reciprocably disposed in the piston unit forming co-axial and communicable supply and reaction chambers, a fluid outlet normally communicating with the motor chamber, conduit means between the reaction and motor chambers, said control unit including a co-axially reciprocable valve assembly including means permitting co-axial fluid communication through a portion thereof and connecting the biasing-pressure, supply, reaction and motor chambers with the fluid pressure source and disconnecting the motor chamber from the fluid outlet.

12. A high pressure fluid operated booster motor as set forth in claim 11 in which said biasing-pressure chamber extends annularly about said piston unit, said piston unit including an annular sealed flange, opposite sides of said flange forming adjacent ends of the biasing-pressure and motor chambers, the area of the exposed side of the flange in the biasing-pressure chamber being less than the area of the exposed side of the flange in the motor chambers.

13. A high pressure fluid operated booster motor as set forth in claim 12 in which the control unit includes co-axial displaceable two-stage pedal reaction transmitting means.

References Cited in the file of this patent

UNITED STATES PATENTS 1,822,667    Proell ------------------ Sept. 8, 1931

FOREIGN PATENTS 424,653    Italy ------------------ Mar. 22, 1944